Figure 1:
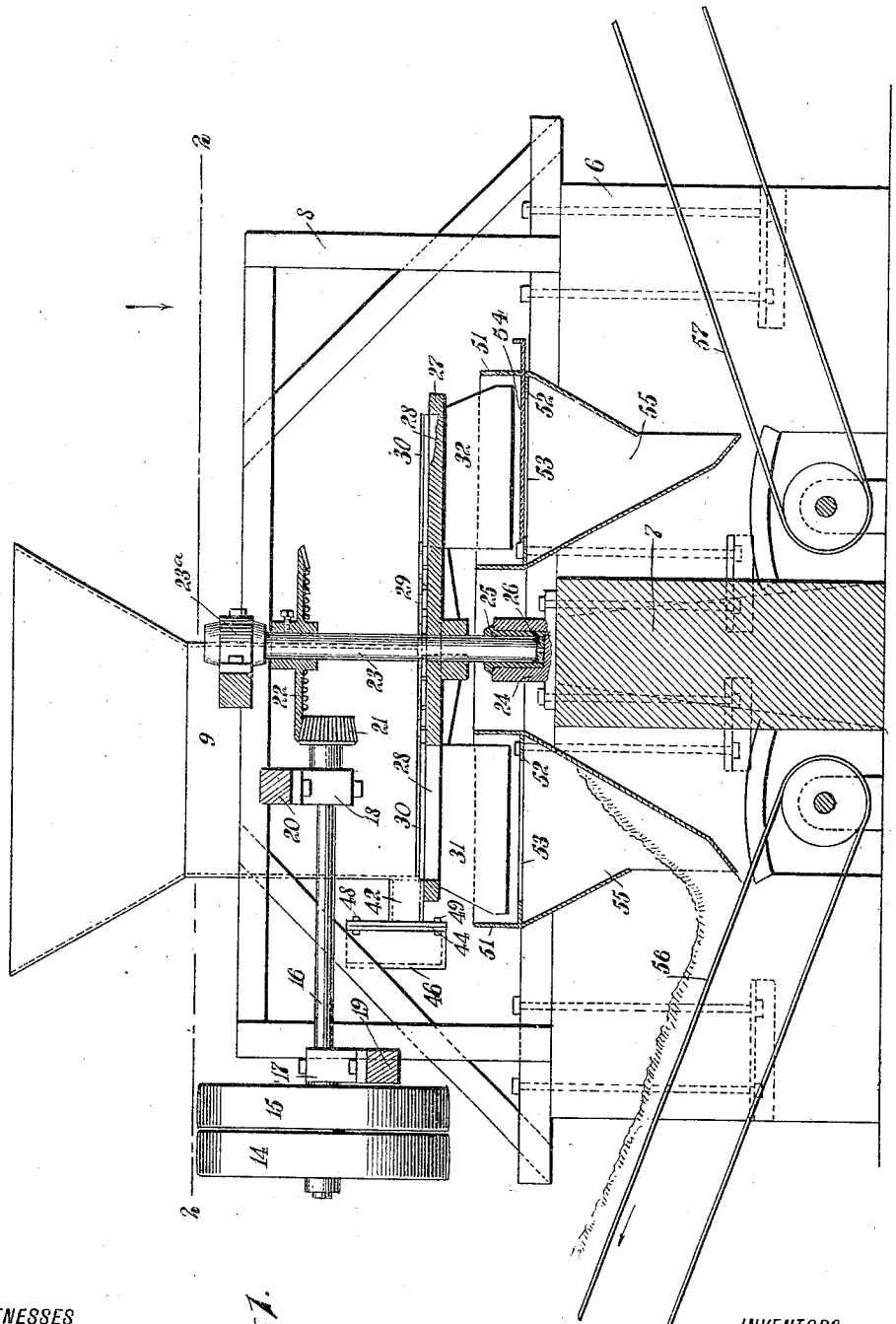

B. JACQUART & J. V. V. BOORAEM.
CLAY CLEANER.
APPLICATION FILED JAN. 5, 1910.

1,136,676.

Patented Apr. 20, 1915.
3 SHEETS—SHEET 1.

WITNESSES
Geo. N. Naylor
Walton Harrison

INVENTORS
Bernard Jacquart
John V. V. Booraem
BY
Munn & Co.
ATTORNEYS

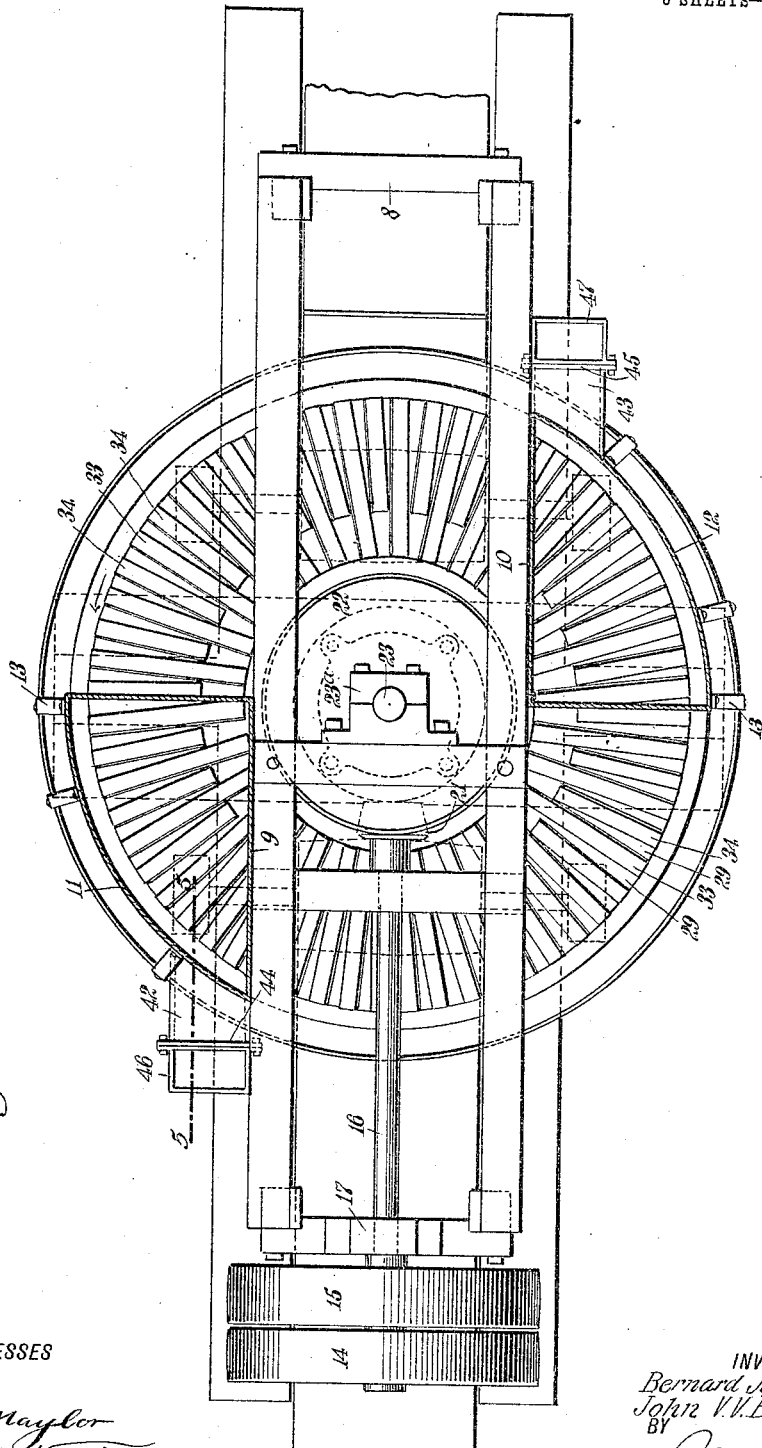

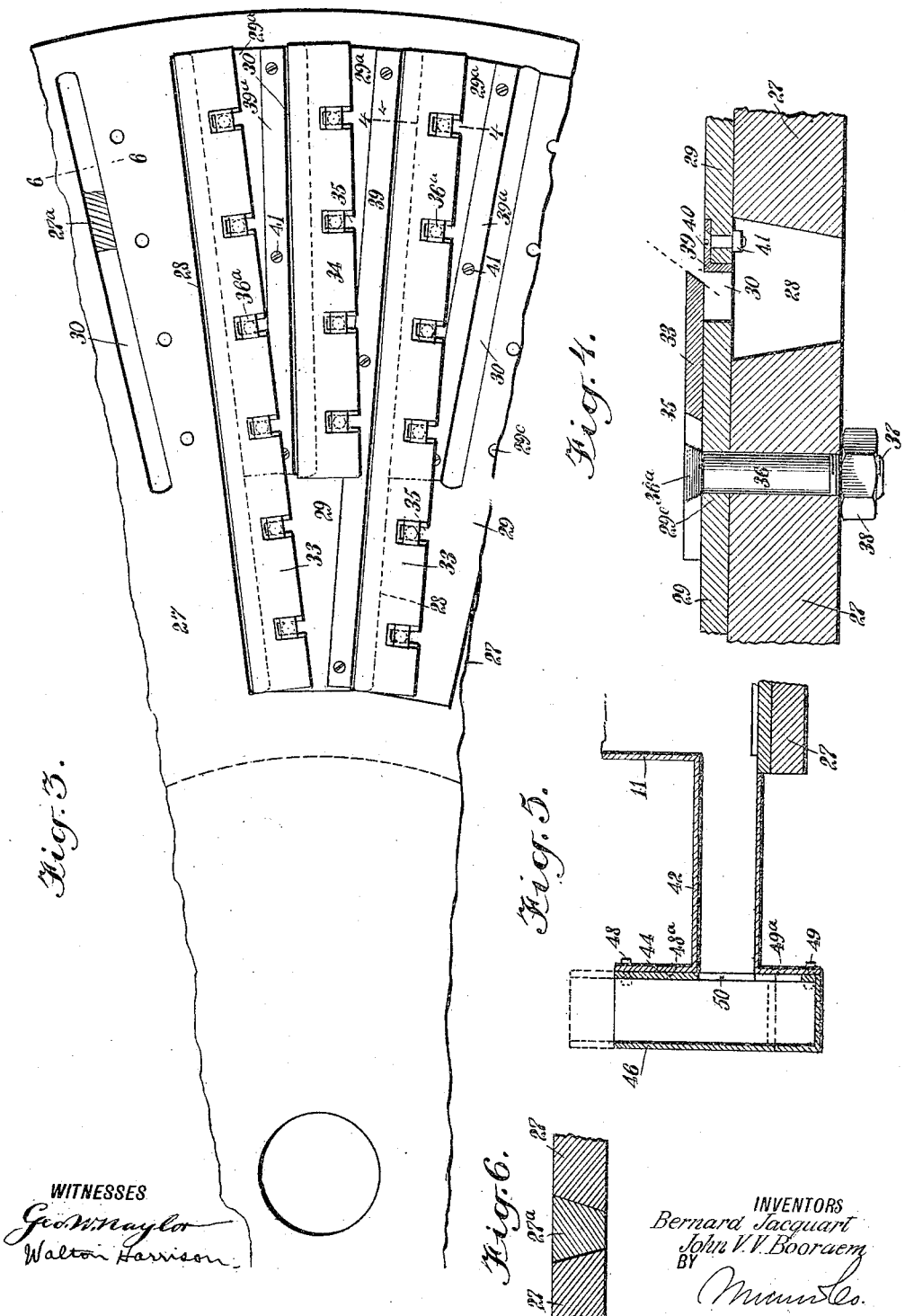

UNITED STATES PATENT OFFICE.

BERNARD JACQUART, OF SOUTH RIVER, NEW JERSEY, AND JOHN V. V. BOORAEM, OF NEW YORK, N. Y.

CLAY-CLEANER.

1,136,676.        Specification of Letters Patent.        Patented Apr. 20, 1915.

Application filed January 5, 1910. Serial No. 536,537.

*To all whom it may concern:*

Be it known that we, BERNARD JACQUART and JOHN V. V. BOORAEM, both citizens of the United States, and residents, respectively, of South River, in the county of Middlesex and State of New Jersey, and the city of New York, borough of Brooklyn, in the county of Kings and State of New York, have invented a new and Improved Clay-Cleaner, of which the following is a full, clear, and exact description.

Our invention relates to clay cleaners—that is, to machines used for separating impurities from large masses of mined clay in order to render the clay suitable for forming bricks or other plastic articles.

Our machine is of the type which cuts away the soft plastic or semi-liquid parts, leaving a more or less hard or solid residium which is worked into a mass and voided as waste matter.

More specifically stated, our invention comprehends improved mechanism for facilitating the purposes above stated, to wit: I. To render the cutting knives adjustable in order that they may from time to time be given new positions to compensate for wear upon them; II. To provide, opposite each knife, a removable shoe which co-acts with the knife in severing the cuttings from the masses of clay and in directing these cuttings on to the conveyers—the removable shoes being made of hard or tough material and being replaceable when worn; III. To provide improved mechanism for assembling or collecting the pebbles and other residuum, which we designate as "waste matter," and found interspersed throughout the mass of clay; IV. To provide an overflow for temporarily housing, and also for ejecting, the pebbles and other waste residual material; V. To provide means whereby the outflow of pebbles and other waste materials may be regulated at will, thereby effecting the purity of the clay considered as a finished product, and also effecting the ease of operation of the machine; VI. To provide means controllable at the will of the operator for gaging the thickness of the cuttings, and also for limiting the size of the pebbles and other impurities which may pass out of the machine along with the cuttings; VII. To enable the waste products, including pebbles and soft plastic materials, to exert a back pressure, controllable at will, upon the mass fed out as waste, the back pressure determining the rate of discharge of the waste product, all as described and claimed.

Reference is to be had to the accompanying drawings forming a part of this specification, in which similar characters of reference indicate corresponding parts in all the figures.

Figure 1 is a vertical section through the machine complete, and showing particularly the rotary face plate provided with knives, the hoppers for receiving the cuttings which are severed from the clay mass and fall through the face plate, and the conveyers, one or more of which are used for removing the finished clay; Fig. 2 is a plan view, partly in section on the line 2—2 in Fig. 1, and showing the discharge outlets for assembling and removing the pebbles and other waste material; Fig. 3 is an enlarged fragmentary plan, showing a portion of the rotary face plate with the cutting knives and parts associated therewith; Fig. 4 is an enlarged section on the line 4—4 of Fig. 3, looking in the direction of the arrow and showing one of the cutting knives together with the removable shoe associated with it; and Fig. 5 is a detail showing in section on the line 5—5 in Fig. 2, one of the discharge outlets for accumulating and discharging the pebbles and other waste materials; and Fig. 6 is a section on the line 6—6 of Fig. 3, showing one of the fillers used for temporarily stopping one of the slots of the cutter wheel, thereby curtailing the capacity of the machine.

Mounted upon a foundation 6, having a cross wall 7, is a frame 8, this frame being used to support various movable and stationary parts, as hereinafter described. At 9, 10 are hoppers which are provided with walls 11, 12, each having a general arcuate form, as will be understood from Fig. 2. The hoppers are supported partially by aid of braces 13. At 14, 15 are tight and loose pulleys which are mounted upon a shaft 16. The latter is journaled in bearings 17, 18 carried by means 19, 20, forming a part of the framework 8.

A pinion 21 is mounted upon the shaft 16 and meshes with a gear wheel 22. The latter is secured rigidly upon a vertical shaft 23 which extends into a bearing 24 mounted upon the upper end of the wall 7. The upper end of the shaft 23 works in another bearing 23ª supported by the framework 8. The bearing 24 is provided with a bearing sleeve 25 and with a wearing plate 26. This wearing plate has generally an annular form, as indicated in Fig. 1, and is therefore adapted to retain and distribute a quantity of lubricant for lessening the friction of the lower end of the shaft 23.

A cutter wheel 27 is provided with long slots 28 and shorter slots 30, all radiating outwardly from the center of the wheel. A number of long sectors 29 and short sectors 29ª are mounted upon the cutter wheel and distributed alternately—that is, first one long sector, next a short sector, next a long sector, next a short sector, etc., as indicated in Fig. 3. Each sector 29 or 29ª partially overlaps two slots 28, 30. The reason for making the slots 28, 30 of different lengths is to economize space, and in doing this to enable a given machine to produce a comparatively large output. If all of the slots were long they would crowd each other and perhaps merge together toward the center of the wheel. By shortening half of the slots the total number may be very large without crowding them too closely together. The slots 28, 30 and the cutter wheel are fitted with spacers 27ª which are removable, these spacers being used merely for the purpose of plugging up any desired number of the slots in order to curtail at will the capacity of the machine. When a slot is plugged by a spacer 27ª this part of the wheel is simply rendered idle.

At 31, 32 are steel plates carried by the cutter wheel 27 and disposed in planes parallel with the slots 28, 30. These plates project directly downward, and as the cutter wheel 27 is rotated the plates sweep around a common center. A number of knives 33, 34, of different lengths, as indicated in Fig. 3, are carried by the sectors 29, 29ª. Each of these knives is provided with a number of slots 35. A number of bolts 36, each provided with a head 36ª, extend through the sectors 29, 29ª and cutter wheel 27. Each head 36ª has substantially the form of an inverted pyramid, so that two of its opposite sides fit neatly into the slot with which it is associated. This enables the hopper to be placed close to the table. Each bolt is provided at its bottom with a threaded portion 37 and revolubly mounted upon the latter is a nut 38. The knives 33, 34 are held in position by pressure of the bolt heads 36ª, the bolts being held tightly by aid of the nuts 38. By loosening these bolts the knives may be removed and replaced.

Our purpose in making the knives of different lengths is somewhat analogous to the purpose of making the slots of different lengths, as above described. That is to say, if all of the knives were long and extended from the outer periphery of the cutter wheel nearly to the center of the same, the knives would crowd each other, and the number being limited by the crowding of the knives adjacent to the center of the wheel, the capacity of the machine would be curtailed. By our arrangement of making some of the knives short, this crowding is effectively obviated and the cutting capacity of a wheel of given size is thus increased.

Mounted partially within each slot 28, 30 is a removable shoe 39, 39ª, having generally the cross section indicated in Fig. 4. Each shoe is held in position by bolts 40, the latter being in turn secured by aid of nuts 41. Each shoe 39, 39ª is sunken partially into the sector carrying it, as indicated in Fig. 4, the sector being cut away for this purpose. Each shoe 39, 39ª extends downwardly through the slot 28 or 30, and terminates at the bottom thereof being flush with the under face of the sector. In order to remove a shoe 39, 39ª, the nuts 41 are loosened and the shoe taken out. It may be replaced by another shoe when worn out. The shoes 39, 39ª, like the slots and knives, are of two different lengths, the purpose being to economize the capacity of the machine. Since the knives are of different lengths and the slots are of different lengths, it necessarily follows that the lengths of the shoes should be similarly differentiated and for substantially the same general purpose.

The hoppers 9, 10 are provided with necks 42, 43 extending horizontally therefrom and located at the bottom thereof. Mounted upon the necks 42, 43 are stationary plates 44, 45, and carried by these plates are boxes 46, 47. The boxes last mentioned are adjustable relatively to the plates 44, 45, by aid of bolts 48, 49 and slots 48ª, 49ª, so that the height of either box may be adjusted at will relatively to the supporting plate 44 or 45 associated with it.

Each box 46 (or 47) is provided with a slot 50 which has a length greater than the vertical depth of the neck 42 (or 43) as will be understood from Fig. 5. By adjusting either box 46 or 47, as just described, the distance from the upper edge of the box to the neck 42 (or 43) may, within reasonable limits, be increased or diminished at will.

An annular trough 51 is provided with an annular bottom 52 containing a number of slots 53, two of these slots being shown in the particular form of the machine now under discussion. Connected with the annular trough 51 and movable relatively to the slots 53 is a slide 54 movable inward and outward by hand, the office of this slide being to open and close the slots 53 wherewith it is associated. Chutes 55 are mounted upon the under side of the annular trough 51 and encircle the slots 53. Conveyer belts 56, 57 are disposed adjacent to the chutes just mentioned and independently of each other convey away such materials as fall upon them.

The operation of our device is as follows: Clay being placed in the hoppers 9, 10 and power being applied to the shaft 16 by aid of the fixed pulley 14, the shaft 23 receives, from the gear wheel 22 and pinion 21, a rotary motion. This causes the cutter wheel 27 and the fixed plate 29 to turn. As each knife 33, 34 passes under the hoppers 9, 10, it shaves off, from the body of the clay contained in the hopper, a cutting which passes downwardly through the slots 30. The various cuttings thus dropping into the trough 51 are, by aid of the steel plates 31, 32, carried around and dropped through the slots or openings 53. If it happens that the slide 54 closes one of these openings, the cuttings are carried around to the other opening and there discharged. In Fig. 1 the slide 54 obstructs one of the openings or slots 53 and the cuttings are consequently passing out through the chute upon the opposite side of the machine and conveyed away by aid of the conveyer belt 56.

As the various cutting knives 33, 34 pare off portions of the clay, the masses of clay in the hoppers are greatly reduced in size. All pebbles too large to pass the knives and enter the slots 30, are necessarily left behind in the residual mass of clay. The constant rotary cutting action of the knives against the under side of the masses of clay contained in the hoppers, tends, however, to force the pebbles and coarser impurities to the outside—that is, against the arcuate walls 11, 12, as will be understood from Fig. 2. The pebbles and other impurities are thus forced out into the necks 42, 43 and thence into the boxes 46, 47. The rotation of the cutter wheel with its knives exerts, against the masses of impurities within the necks 42, 43 and boxes 46, 47, a gentle pressure which tends constantly to force the impurities out at the tops of these boxes. Suppose, however, that one of the boxes 46, 47 is adjusted and occupies its uppermost position, as indicated in Fig. 1. In this event a greater amount of pressure is required to force the pebbles and other impurities to the top of the box 46. In fact, the pebbles and other impurities contained within the box appear to exert a back pressure, and in a measure to resist the outward pressure of the impurities as forced through the neck 42 by the action of the cutting knives. We find that by adjusting the height of the boxes 46, 47, not only can we regulate within certain limits the comparative purity of the clay cuttings, but can also determine, within suitable limits, the rapidity of the flow of the waste materials, including the pebbles.

It will be understood in connection with the foregoing remarks, that in work of this kind it is sometimes desirable to give the finished product of the machine a high degree of purity, and that, too, somewhat independently of the cost of working. At other times it is desirable, especially where cheapness of operation is a dominant consideration, to have the machine accomplish a considerable volume of work, regardless of whether the removal of the pebbles and other impurities is quite as thorough as in the instance just mentioned.

The operator, by adjusting the relative positions of the knives and also by adjusting the relative altitudes of the boxes 46, 47, can give this machine a considerable range regarding the purity of the materials, the sizes of the pebbles left therein, and the volume of purified material passing through the machine.

We find that by making the knives 33, 34 of different lengths and so distributing the knives that the long ones alternate with the short ones, as indicated in Fig. 3, the output of the machine is greatly increased. This is due, in a measure, to the fact that the outer peripheral surface of the cutter wheel and of the face plate is larger than the portion nearest the center of rotation, and consequently affords room for a larger number of knives. It is, of course, expedient to place as many knives as practicable in a given area, in order that as much cutting as possible may be done for the construction of a given amount of framework. Hence, there is economy in distributing the knives as indicated. We find, moreover, that this distribution of the knives brings about another good result—to wit, that it renders the work of the machine more uniform relatively to different portions of the masses of clay operated upon. The slots 28, 30 have similar cross sections, each slot having a width across which gradually tapers from top to bottom, as will be understood from Fig. 4, in which one of the slots 28 is shown. As the spacers 27$^a$ have also a tapered width from top to bottom, the spacers are caused to fit neatly into the slots so that the tops of the spacers are rendered flush with the upper surface of the cutter wheel. By inserting any number of spacers 27$^a$ the total capacity of the machine may be curtailed at will. By thus constructing the slots, the knives associated with them may be removed for any purpose, such as to sharpen them with a view to replacing them by other knives.

The apparatus above described works to better advantage when the hoppers are full or nearly full of the raw material. If it happens that the machine ejects the finished product more rapidly than the raw material can be supplied, this condition can not be maintained for any great length of time, as the hoppers become nearly empty. If the supply to the apparatus is, say, two, three, or four cars per hour, the product may be graded, to a limited extent at least, by varying the number of knives operating, and in order to do this the slots corresponding to the knives are plugged up, as above described, by aid of the spacers.

Having thus described our invention, we claim as new and desire to secure by Letters Patent:

1. The combination of a hopper provided with an arcuate wall, a neck communicating with said hopper and extending outwardly from said wall, a plate mounted upon said neck and fixed relatively to the same, a box provided with a slot for registering with the opening in said neck, said slot being longer than said opening, means for adjusting said box relatively to said plate, and a cutter wheel disposed adjacent to said hopper and revoluble for the purpose of forcing pebbles and other impurities through said neck.

2. The combination of a hopper provided with an outlet, cutters movable relatively to said outlet for the purpose of cutting material discharged therefrom, a neck mounted upon said hopper at a point adjacent to said cutters and adapted to receive stones and other impurities forced out of the material operated upon by said cutters, a receptacle for receiving said stones and other impurities, and means for regulating the rate of passage of the said stones and other impurities into said receptacle.

3. The combination of a revoluble member provided with slots, said slots being wider at the top than at the bottom of said revoluble member, sectors mounted upon said revoluble member and separated from each other by slots, said last-mentioned slots being narrower than said slots in said revoluble member, knives mounted upon one of said sectors and extending over the slots separating said sectors, and means for adjusting the position of said knives relatively to the sectors upon which they are mounted.

4. The combination of a revoluble member provided with a slot, a sector mounted upon said revoluble member and overhanging a portion of said slot, an L-shaped shoe sunken into said sector and removably connected therewith, said shoe being provided with a down-turned portion extending across the overhanging edge of said sector, another sector mounted upon said revoluble member and in registry with said first-mentioned sector, a knife mounted upon the second-mentioned sector, and means controllable at will for adjusting the position of said knife relatively to said sectors.

5. The combination of a cutter wheel provided with longitudinal openings, said openings being wider adjacent to one face of said wheel than to the other face thereof, sectors mounted upon said wheel and partially covering said openings, knives mounted upon some of said sectors and overhanging the spaces between successive sectors, and means for adjusting said knives relatively to said last-mentioned openings.

6. A clay cleaner, comprising a rotatable knife, a hopper in feeding position relatively thereto, and a pebble box in communication with the sheet of clay on the knife and located so as to support the pebbles therein with a back-pressure against said clay sheet, and means for regulating this back pressure of the pebbles in said pebble-box.

7. The combination of a hopper provided with an outlet, cutters movable relatively to said outlet for the purpose of cutting material discharged therefrom, a neck mounted on said hopper at the point adjacent to said cutters, and adapted to receive stones and other impurities forced out of the material operated upon by said cutters, a receptacle for receiving stones and other impurities having an opening therein, said receptacle being vertically adjustable with respect to said neck, said stones and other impurities being forced through said neck into said receptacle, and out of said receptacle through the opening thereof.

In testimony whereof we have each signed our names to this specification in the presence of two subscribing witnesses.

BERNARD JACQUART.
JOHN V. V. BOORAEM.

Witnesses to the signature of Bernard Jacquart:
JOHN H. FUNK,
FRANK DE S. MEADE.

Witnesses to the signature of John V. V. Booraem:
WALTON HARRISON,
PHILIP D. ROLLHAUS.